(No Model.) 5 Sheets—Sheet 1.
A. KEITH, J. P. TIRRELL & J. W. WILLARD.
COIN CONTROLLED VENDING MACHINE.
No. 519,385. Patented May 8, 1894.

WITNESSES
INVENTORS

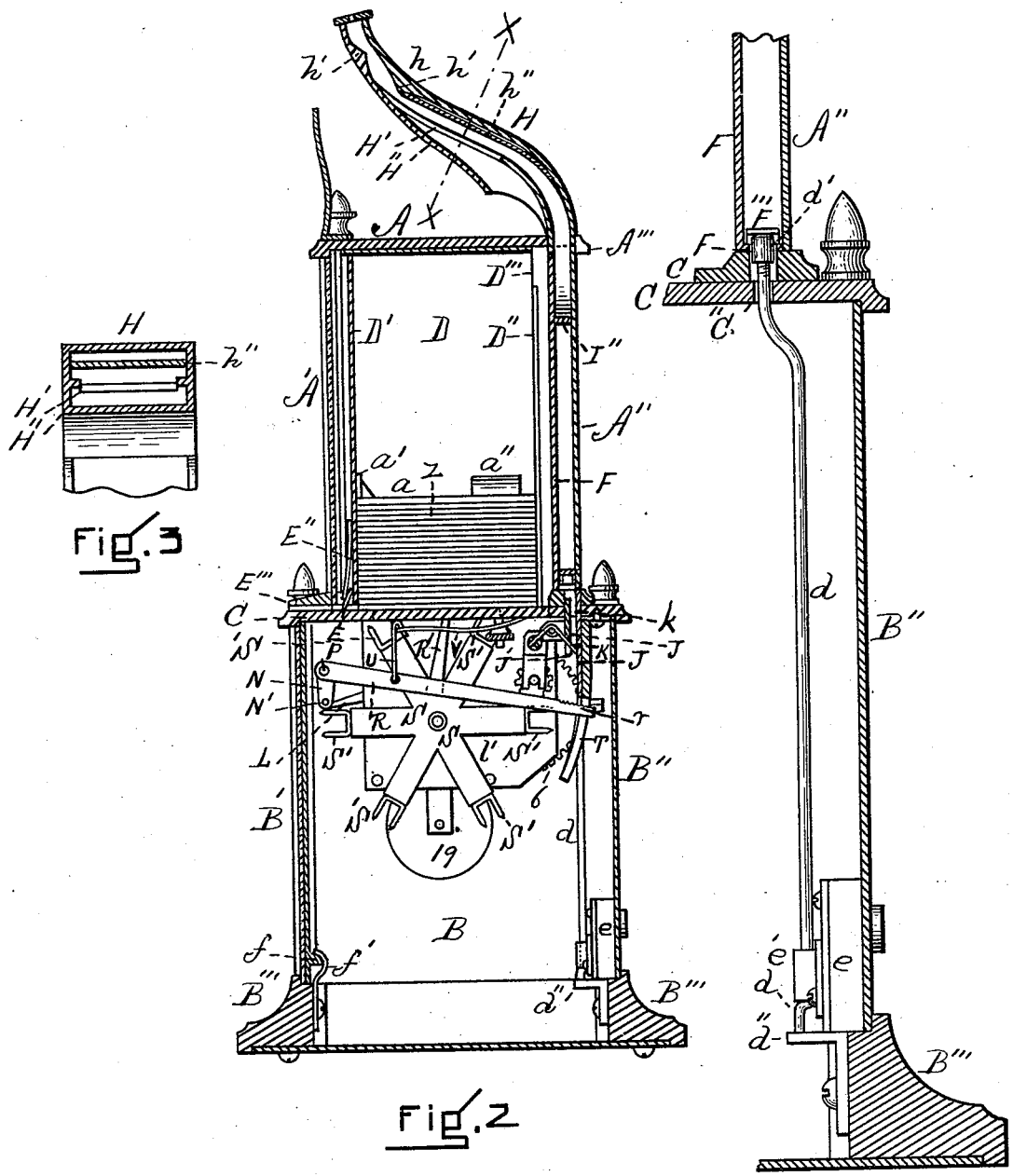

(No Model.) 5 Sheets—Sheet 3.
A. KEITH, J. P. TIRRELL & J. W. WILLARD.
COIN CONTROLLED VENDING MACHINE.

No. 519,385. Patented May 8, 1894.

WITNESSES
J. M. Hartnett.
B. W. Williams

INVENTORS
Alexander Keith
Jacob P. Tirrell
John W. Willard
By their Att'y
Henry W. Williams (No Model.) 5 Sheets—Sheet 4.
A. KEITH, J. P. TIRRELL & J. W. WILLARD.
COIN CONTROLLED VENDING MACHINE.
No. 519,385. Patented May 8, 1894.

WITNESSES
J. A. Hartnett
B. N. Williams

INVENTORS
Alexander Keith
Jacob P. Tirrell
John W. Willard
By their Atty.
Henry W. Williams

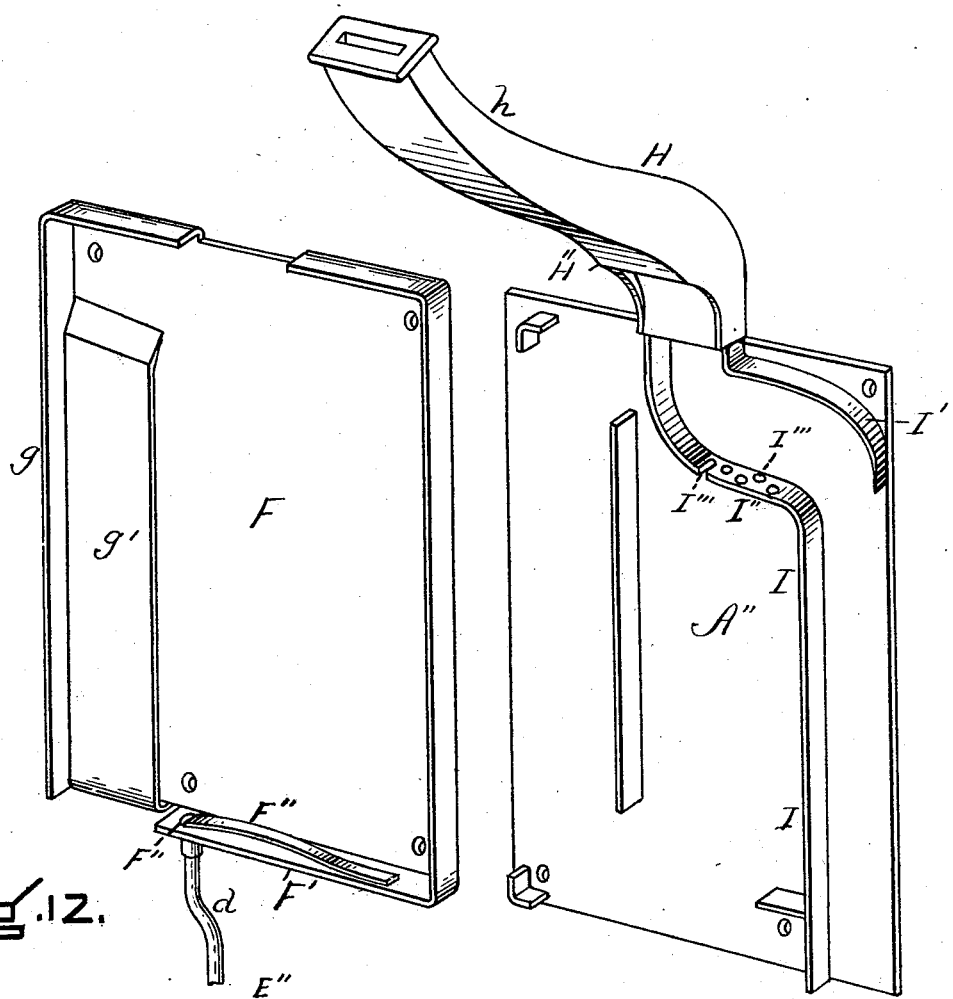

UNITED STATES PATENT OFFICE.

ALEXANDER KEITH, OF EVERETT, AND JACOB P. TIRRELL, OF BOSTON, MASSACHUSETTS, AND JOHN W. WILLARD, OF PITTSFORD, VERMONT, ASSIGNORS TO SAID WILLARD.

COIN-CONTROLLED VENDING-MACHINE.

SPECIFICATION forming part of Letters Patent No. 519,385, dated May 8, 1894.

Application filed June 22, 1893. Serial No. 478,509. (No model.)

*To all whom it may concern:*

Be it known that we, ALEXANDER KEITH, of Everett, in the county of Middlesex, and JACOB P. TIRRELL, of Boston, in the county of Suffolk, State of Massachusetts, and JOHN W. WILLARD, of Pittsford, in the county of Rutland and State of Vermont, citizens of the United States, have invented new and useful Improvements in Coin-Controlled Vending-Machines, of which the following is a specification.

This machine is intended particularly, but not necessarily exclusively, to automatically supply postage stamps to a purchaser upon the introduction of a coin; and the present intention is to supply stamps, to the value of five cents, upon the introduction of a five cent piece, the revenue from the machine arising not from any profit on the stamps (which are sold at cost), but from other sources, such as advertising, &c.

Our invention has for its principal objects, to prevent the machine from being cheated or pilfered from, in any manner, and to render its operation generally more efficient, exact, and certain.

The nature of the invention is fully described below, and illustrated in the accompanying drawings, in which—

Figure 1:
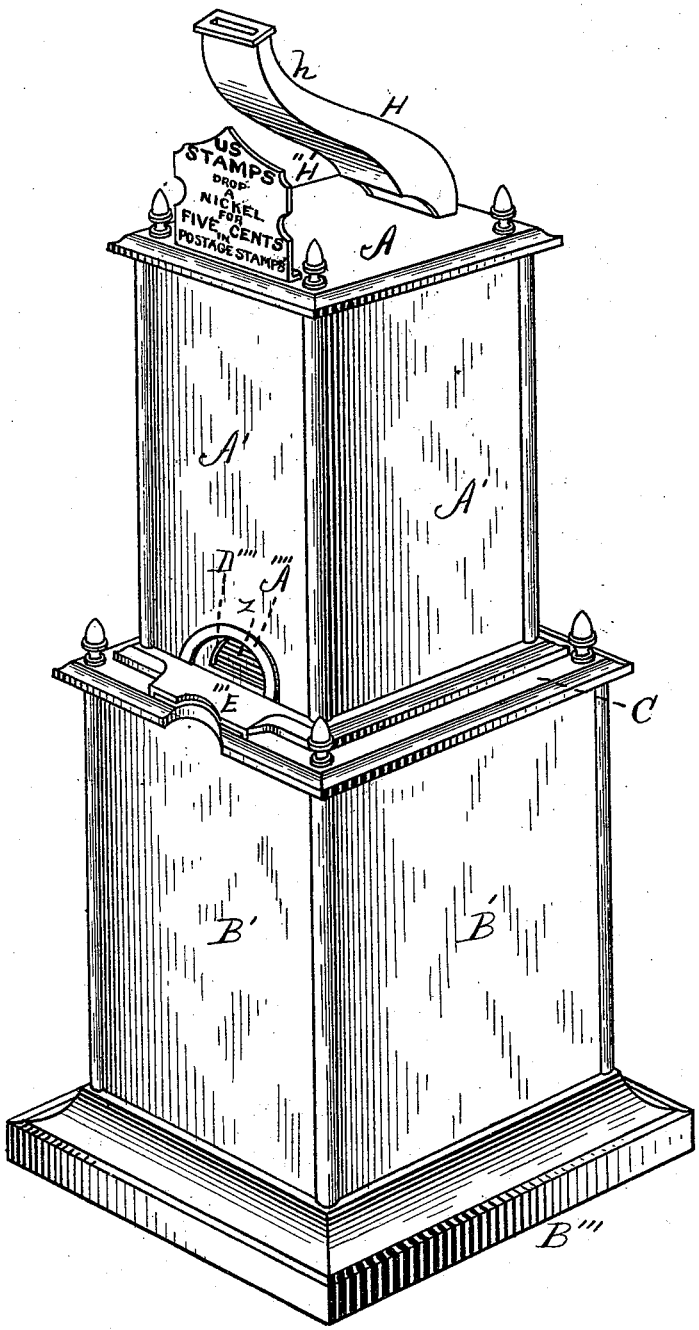
Figure 5:
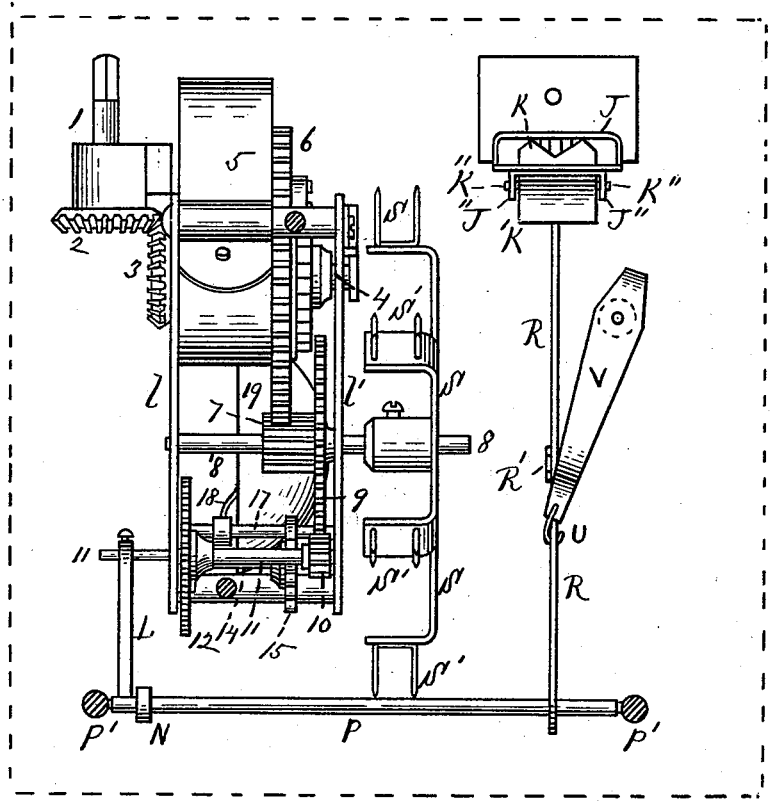
Figure 6:
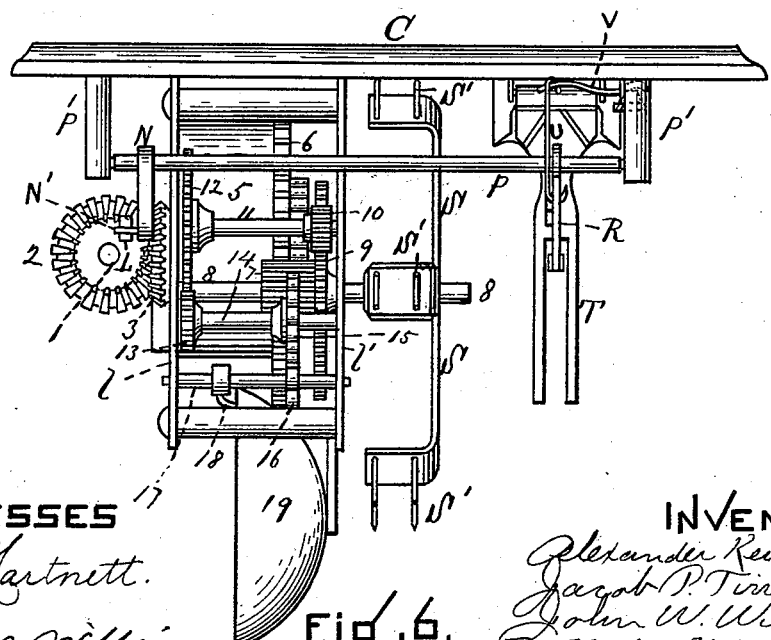
Figure 7:
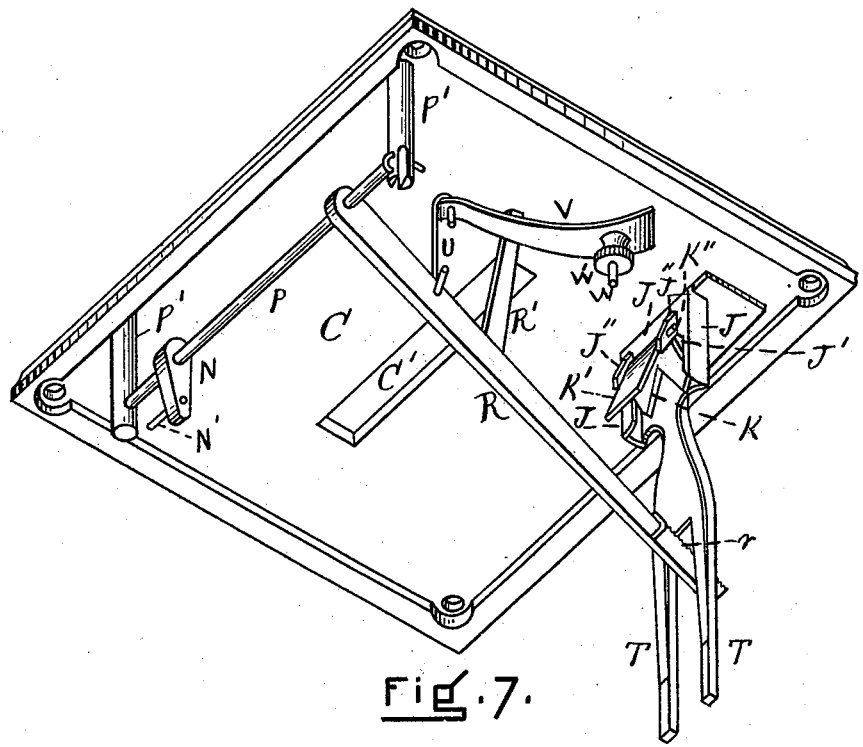
Figures 8, 9, 10:
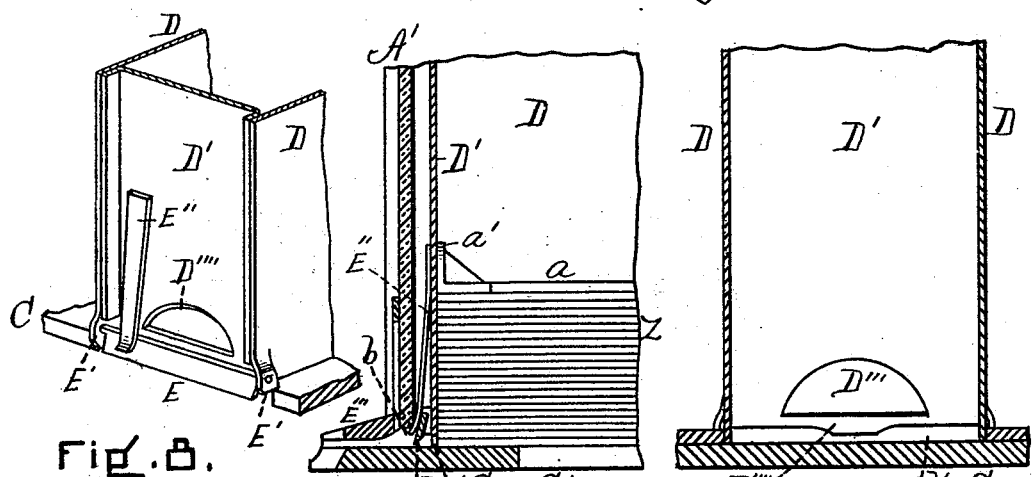
Figure 11:
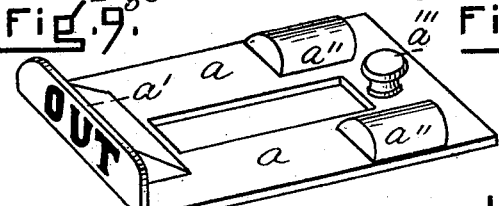

Figure 1 is a perspective view of our improved machine. Fig. 2 is a sectional view of the same. Fig. 3 is an enlarged section taken on line $x$, Fig. 2. Fig. 4 is an enlarged section, illustrating the locking mechanism. Fig. 5 is a plan view of the wheel train and actuating mechanism contained in the lower chamber, the outline of which is shown by broken lines. Fig. 6 is an elevation of the same looking from the front of the machine. Fig. 7 is a perspective view showing the under side of the top of the lower chamber—or separating floor between the lower and upper cases—with certain of the mechanism secured thereto. Fig. 8 is an enlarged detail in perspective of a portion of the commodity receptacle within the upper case. Fig. 9 is a vertical section of the same taken on a line running centrally from the front to the rear. Fig. 10 is a vertical section of the same, taken on a line at right angles to the line of the section in Fig. 9. Fig. 11 is an enlarged view of the weight which presses down the envelopes containing the commodity. Fig. 12 is a perspective view showing the inner or rear side of a partition or shallow case which lies against the rear partition of the upper case. Fig. 13 is a view of the rear wall of the upper case with its rigid attachments. Fig. 14 is a sectional view taken on a line running from front to rear and showing the position of the engaging spurs after the commodity has been delivered.

Similar letters and figures of reference indicate corresponding parts.

A is the upper or commodity case, whose front and side walls A' are preferably made of glass panels secured in position in any desired manner; and B is the lower case containing the actuating mechanism, the front and side walls of said case being preferably of glass panels B'. The object of making the walls of glass is to allow printed material, &c., such as advertising matter, to be exhibited through them if desired.

A'' (Figs. 2, and 3), is the detachable rear wall of the upper case, and B'' the rear wall of the lower case, both said walls being preferably of metal.

B''' is the base.

C is the floor of the upper chamber, or horizontal partition dividing the two chambers, provided with the slot C' (Figs. 7, 9, and 14), through which the spurs S', of the delivery wheel S,—below described,—sweep, and engage the lowest of the envelopes $z$, each of which contains five cents' worth of stamps. These envelopes lie in a vertical pile within a commodity receptacle which consists of two parallel side walls D D extending up from the floor C on opposite sides of and parallel with the slot C', and the front wall D', see Figs. 2, 8, 9, and 10. The rear edges of the side walls are provided with inwardly bent flanges D'', (Fig. 2,) which extend nearly to the top of the upper chamber, having a space D''' through which to insert the weight when the receptacle is nearly full. The area inclosed by said walls is but slightly larger than, and substantially fits, the envelopes. The front walls A' and D' are provided coincidently with openings or windows A″″ and D″″ respectively, at their lower ends, through which the envelopes can be seen. The pile of envelopes is surmounted by a weight $a$ (Figs. 2, 9, and 11), provided with a turned up lip $a'$ on its front edge, on which is inscribed the word "Out." When the envelopes are nearly exhausted, the weight reaches, in its descent, the opening D″″, and when they are all gone, the word "Out" shows plainly through windows D″″ and A″″, warning a would-be purchaser. The weight of this lip is balanced by thickened integral portions $a''$ near the rear portion of the surface of the weight, which is provided for convenience with a handle $a'''$.

The general arrangement of the chambers and operation of the delivery wheel case, are not widely dissimilar from those shown in United States Letters Patent to Virgil A. Krepps, granted July 19, 1892, and numbered 479,005. It is found, however, that in practice, owing to the peculiarly merchantable character and fixed value of the commodity for which this machine is especially adapted, viz., postage stamps, it is necessary to pay especial attention to means for preventing thieving from, and cheating, the apparatus. In order to prevent pilfering, we first arrange the movement of the delivery wheel S, so that when it is not engaged in pushing forward the lowest envelope, the spurs S′ next to advance are in engagement with the lowest envelope at a rearward angle, as shown in Fig. 14, so that should a person manage to get a hook into engagement with the envelope, he could not draw it out without tearing it. Next we arrange, behind the horizontal delivery slot $b$ at the bottom of the front wall A, (see Fig. 9,) a gate E, (Figs. 2, 8, 9, and 14,) pivoted at its ends horizontally to ears E′ on the lower front edges of the guide-partitions D. This gate is held normally closed between the delivery slot $b$ in the front wall A′ and the coincident delivery slot $b'$ in the wall D′ by a light spring E″ which presses on its outer side. Hence, while the envelope which is being delivered by the advancing spur S′ easily lifts this gate against the power of the spring, an implement inserted in the slot $b$ would find the gate to be an obstacle. Moreover, we provide a nearly or quite horizontal guard plate E‴ (Figs. 1, 2, 9, and 14), which extends from the front wall A of the upper chamber over the upper front edge of the floor C, thus leaving a space of only sufficient height to allow the envelope to pass and of considerable breadth and length, so that the difficulties attending the insertion of an instrument such as a knife, for example, for thieving purposes are increased.

Inasmuch as it is important that the central portion of the advancing envelope, viz., the portion which is engaged by the delivery wheel, should be kept down flat, and not curve or hump, as is sometimes the case, the lower edge of the front wall D′ is extended downward centrally at D″″″ as shown in Fig. 10, so that if the envelope is not perfectly flat, its edges, which would be the portions extending up, will have ample space through which to pass, while the central portions remain flat and hence under the part D″″″.

The manner in which the device is put together and locked, or taken apart, will be understood from the following description of parts. The rear wall A″ of the upper chamber has secured to it the shallow tray or box F, see Figs. 4, 12 and 13, the lower flange F′ of said tray or partition F being provided with a perforation F″ over which a spring F‴ extends. A long substantially vertical rod or bolt $d$ extends up through a hole C″ in the floor C and the perforation F″, and is surmounted by a head $d'$ which is under and in contact with the spring F‴. The lower end of the bolt $d$ rests on a bracket $d''$ secured to the base B‴, and a guide $e'$, secured to the case $e$ of a lock attached to the inner side of the rear wall B″ serves as a strap to guide its movement. The front wall B is provided on its inner side with a projection or rib $f$ which lies normally under a curved lip $f'$ secured to the inner side of the base B‴, see Fig. 2. When the machine is in service the front wall B′ is secured to the base B‴ by the rib and lip $f f'$, and the rear wall D″ is locked in the ordinary manner by a key, the rod $d$ extends up through the holes C″ F″, and, pressing up the spring F‴ holds the rear lower edge of the rear detachable wall A″ while its upper edge lies under the flanged rear edge or eave A‴ of the top of the upper case. The upper and lower cases being practically integral, the device is thus securely closed. To open it, unlock the lock, tip up the rear of the device, using the parts $f f'$ as a pivot, and thus allow the spring F‴ to press down the bolt $d$—which has by the tipping process been released from its seat on the bracket $d''$—out of the perforation F″, and the back A″ can be swung outward and removed, its upper end acting as the pivotal one.

H is the coin-chute or coin-conduit integral with the removable rear wall A″,—Figs. 1, 2, and 13. This coin-chute is constructed with especial reference to preventing the machine from being tampered with or cheated by any of the methods now known. The chute is set at an angle, and is substantially on the lines and plan of that shown in the Letters Patent above referred to. Its underside is slotted at H′, (Figs. 2 and 3) so that a coin of smaller denomination drops onto the platform H″ and thence falls upon the outside of the machine, as described in the said patent. It will be noticed, however, that our coin-chute has a distinct bend at $h$ so that it is not straight as in said patent. This is to prevent a smaller coin from being shot with sufficient force to leap over the slot and enter the machine. The bend $h$ would prevent a flying leap of that sort. Moreover, we provide on the inner upper and lower surfaces of the chute, one or more, preferably two, obstructive protuberances, or semi-partitions $h'$. These present such angles to the coin that it slides over one and encounters the next, and thence proceeds on its way down the chute at the proper speed, *i. e.*, the speed produced by gravity unaided by impulse. A quick snapping of a lighter coin in the hope of adding force enough to overcome the lack of weight and trip the machine, as well as leap the slot, would be unsuccessful owing to these obstructions. Again, a guide wall or partition $h''$ is placed over the slot so as to prevent the coin from turning over and rolling edgewise through the slot, or becoming wedged.

As the coin-chute reaches the top of the machine, its upper or rear wall merges with the rear partition $A''$ (Fig. 13), with which it is integral, while its front wall is produced by the partition F (Fig. 12). Its sides are provided with the flanges I and $I'$, the former of which extends to the floor of the upper chamber and the latter extends to the side flange $g$ on the edge of the partition F. A sharp bend is made at $I''$ in the flange I corresponding with the curve in the opposite flange $I'$. By this means successful operations with a strip of pasteboard are prevented, or with a dummy coin flattened or cut off on its opposite edges. The under flange is provided at its bent portion $I''$ with perforations or slots $I'''$ intended to arrest the progress of a wire by catching its end, or divert it from the conduit. The partition F is provided at the portion which acts as a wall of the coin-chute with a raised vertical strip $g'$ which serves to guide the coin, so that it falls edgewise and with regularly accelerated velocity and strikes, with its edge, an even blow.

The floor or horizontal partition C, is provided with a slot $k$ (Fig. 2) with which the lower end of the chute H, I, $I'$, $g$, connects, and secured to the under side of said partition, within the lower chamber B, is a continuation J of the chute, see Figs. 2, 5, 6, and 7. One of the four sides of this supplemental chute J is cut away at $J'$ in order to admit the notched leaf K of a trap consisting of two leaves bent at substantially right angles with each other as shown, the said leaf K being notched, and the other, $K'$ being plain, and somewhat heavier than the leaf K. This trap is horizontally pivoted at its bend at $K''$ to ears $J''$ extending from the supplemental chute J, and is so hung that the heavier leaf $K'$, dropping, swings the notched leaf K normally into and across the chute J and against its opposite wall at a downward angle, as shown in Figs. 5 and 7. Should a five cent piece be tied to a string, and dropped into the chute with the intention of withdrawing it, and actuating the mechanism a second time with the same coin, the coin would knock down the leaf K, and pass through the chute J, and might actuate the trip-lever once, but as soon as the coin dropped by the leaf K, said leaf would return by gravity to its position across the chute J, the string extending through the notch. Then if the string should be pulled in order to withdraw the coin, the coin would be jerked against the under side of the leaf K and held there, or the string would be cut by the sharp edges of the notch.

$l\ l'$ are the two plates for supporting the train of gear or actuating mechanism, said plates being sustained by the partition C,—Figs. 2, 5, and 6. In a train of gear in itself considered, nothing is claimed as new. The winding arbor 1 extends through the rear wall $B''$ of the lower chamber, in order that the side and front walls may be free to be utilized as advertising space. By means of the gears 2 and 3 and shaft 4, the spring 5 is wound, the driving gear-wheel 6 on said shaft engaging the pinion 7 on shaft 8, on which is also the gear wheel 9 engaging with the pinion 10 on shaft 11, on which is the gear wheel 12 engaging with the pinion 13 on shaft 14, on which is the escape wheel 15 engaging with the verge 16 on the arbor 17, to which is fixed the hammer 18 which strikes continuously the gong-bell while the train is in action.

The shaft 8 extends through the plate $l'$ horizontally, and has fast on it the delivery wheel S made preferably with six arms, which are bent at their ends and provided thereby with the pairs of spurs $S'$. The shaft 11 extends horizontally through the plate $l$, and has fast on its outer end the detent L lying normally in engagement with the pin or projection $N'$, extending horizontally from the free end of the pawl N, fast on the horizontal shaft P, whose bearings are in the hangers $P'$ secured to the partition C, Figs. 2, 5, 6, and 7.

R is the trip-lever, one end of which is fast on the shaft P, while the other lies between the curved prongs T, extending down from the chute J, and describing an arc of a circle whose center would be at the shaft P. An arm $R'$ extends from the trip-lever R, its end resting against the partition C, thus limiting the upward movement of the trip-lever. The trip-lever is connected by a link U with the outer end of a spring V whose opposite end is secured to the partition C by a screw W. A nut, $W'$, on said screw, bears upon the spring and regulates its tension to a nicety, and consequently the amount of force necessary to trip the lever R.

When the coin is dropped through the chute, it falls on the free end of the trip-lever R, which is exactly under the mouth of the chute J, with the result that the trip-lever swings down in the fork T, partially rotating the shaft P, releasing the pin $N'$ on the pawl N from the detent L, and allowing the detent to make one revolution by means of the clockwork mechanism, when it again strikes the pin and is arrested. The effect of this operation is to move the delivery wheel a sixth of a revolution (the gear in the train being so arranged as to produce this result), so that the spurs which are in engagement with the lowest envelope in Figs. 2 and 14 move into the position of the spurs on the arm in advance, delivering the commodity as above described, and the spurs on the arm behind, advance into engagement with the lowest envelope. During this operation, i. e., during the delivery of the commodity, the bell 19 is rung continually by the blows of the hammer 18 actuated by the verge 16.

The upper surface of the trip-lever is roughened or serrated, as shown at $r$, Figs. 2 and 7, to prevent the coin from sliding off, and to obtain a firm grip in order that the trip-lever may receive the full force of the blow.

The tension mechanism has not only the advantage of exact and delicate adjustment, but, partly by reason of such delicate adjustment, it prevents the mechanism from being jarred into action, as has been a fault in some coin-controlled machines. The trip-lever may be jarred off its seat for quite a distance without setting the mechanism in motion, and yet the force of a descending five cent piece never fails to deliver the commodity.

Having thus fully described our invention, what we claim, and desire to secure by Letters Patent, is—

1. In a coin-controlled vending machine, the combination with the coin-chute or coin-conduit, of the trap comprising the leaf or plate K provided with a notch in its outer edge and pivotally hung in the passage in the chute so as to swing normally against the farther wall thereof, substantially as set forth.

2. In a coin-controlled vending machine, the combination with the coin-chute or coin-conduit, of the trap comprising the leaf or plate K provided with a notch having sharp edges in its outer edge and pivotally hung in the passage in the chute so as to swing up normally against the farther wall thereof, substantially as described.

3. In a coin-controlled vending machine, the combination with the coin-chute or coin-conduit, of the trap comprising the heavier plain leaf K' and lighter notched leaf K, bent at right angles to each other and hinged to the conduit so as to cause the notched leaf to swing into the passage in the coin-chute and close it against a rising object, substantially as set forth.

4. The combination of the back plate A''' provided with the chute H and flanges I I', and the tray or plate F provided with the raised guide $g'$ and flange $g$, substantially as described.

5. The combination of the upper case A, integral coin-conduit H and back plate A''', plate F provided with the flange F' perforated at F'', partition C perforated at C'', lower case B provided with the inner flange or bead $f$, base B''' provided with the lip $f'$, and the rod $d$ extending from the lower case through said perforations, substantially as set forth.

6. The combination of the back plate A''' and plate F provided with the perforated flange F', spring F''' projecting over said perforation, partition C provided with a perforation C'' coincident with the perforation in the flange, lower case provided with a suitable lock, and rod or bolt $d$ provided with a head $d'$ and held normally down by said spring and extending through said perforations into the lower case, substantially as described.

7. The commodity chamber, comprising side walls and the front wall D' cut away at the bottom to form a delivery slot and having the end portions of said slot higher or broader than the central portion, substantially as described.

8. In combination, the trip lever R directly actuated by the descending coin, the tension spring V, secured to the under side of the partition C adjustably by the screw W and nut W', the link U connecting said spring with the trip lever, the shaft P actuated by said trip lever and supported by the case, the pawl N fast on said shaft and provided with the pin N', and detent L actuated by the train, whereby the tension is adjusted to the force of the blow of the descending coin as it impinges against the trip lever, substantially as set forth.

ALEXANDER KEITH.
JACOB P. TIRRELL.
JOHN W. WILLARD.

Witnesses:
HENRY W. WILLIAMS,
D. W. WILLIAMS.